3,221,075
METHOD OF PRODUCING CONJUGATED DIOLEFINS
Yoshito Hamamoto and Akio Mitsutani, Kurashiki, Japan, assignors to Kurashiki Rayon Company Limited, Kurashiki, Japan, a corporation of Japan
No Drawing. Filed Oct. 22, 1962, Ser. No. 232,300
Claims priority, application Japan, Oct. 27, 1961, 36/38,853; May 26, 1962, 37/21,528
7 Claims. (Cl. 260—681)

This invention relates to a method of producing conjugated diolefins and more particularly to the production of butadiene and isoprene by the catalytic decomposition of mono- or di-alkyl metadioxane.

Butadiene and isoprene have recently become noteworthy as materials of important synthetic rubbers under the name of stereorubber and its economical and profitable production is one of the important conditions for determining the success or failure of the industrial production of the desired polymers. More particularly, the synthesis of isoprene has been very difficult and the considerably high cost of the monomer made the industrial production of cis-1,4-polyisoprene difficult. On the other hand, the method of manufacturing conjugated diolefins where mono- or di-alkyl-metadioxane is synthesized from mono-olefin and formaldehyde by using Prins-reaction and mono- or di-alkyl-metadioxane thus obtained is catalytically decomposed to obtain conjugated diolefins is taking attraction as an economically useful process. As catalysts which are active to the catalytic decomposition of mono- or di-alkyl-metadioxane, have heretofore been known as so-called solid phosphoric acid, which consists of ortho- or pyro-phosphoric acid supported on a carrier having silica as the main component, such as silicon carbide, titanium oxide, and calcined at a temperature below 600° C. The catalysts consisting of ortho- or pyro-phosphoric acid supported on a carrier have been well known to have strong activity to the polymerization of lower aliphatic olefins and often used for the dimerization and trimerization of olefins. When such solid phosphoric acid catalyst is used, owing to its activity for the polymerization of olefins for the catalytic decomposition of mono- or di-alkylmetadioxane, the polymerization and carbonization of the produced conjugated diolefins lower the selectivity thereof, that is, reduce the yield of conjugated diolefin on reacted metadioxane and increase the manufacturing cost as has heretofore been disclosed.

The inventors have found that if mono- or di-alkyl-metadioxane is catalytically decomposed by using a catalyst which consists of ortho- or pyro-phosphoric acid supported on a carrier having silica as the main component and has removed water soluble parts therefrom the conjugated diolefins can be produced with very good yield.

The catalyst carriers to be used in the invention include those having silica as the main component, such as silica-gel, kieselguhr, white carbon and quartz sand.

A process of removing water soluble parts from the carrier having silica as the main component and supporting ortho- or pyro-phosphoric acid thereon is to calcine the catalyst prior to its use for reaction at a temperature above 700° C. and below 1,200° C., for at least 2 hours, preferably more than 10 hours, by passing nitrogen, oxygen or air. By this treatment the water soluble parts in the catalyst can be removed completely.

Another method of eliminating water soluble parts in the catalyst is such that after ortho- or pyro-phosphoric acid is supported on a carrier having silica as the main component it is calcined at a temperature less than 700° C. and then washed with water to extract water soluble parts. By using any one of the above two processes ortho- or pyro-phosphoric acid which are soluble in water as well as various substances can be perfectly removed, so that there remains water insoluble phosphor compounds only on the carrier surface.

By either one of the above two processes, when the catalyst is used for the catalytic decomposition of mono- or di-alkyl-metadioxane the conjugated diolefins can be manufactured with considerably high selectivity. Mono- or di-alkyl-metadioxane to be used includes 4-methyl-metadioxane; 4,4-dimethyl-metadioxane and 4,5-dimethyl-metadioxane. Butadiene is produced from 4-methyl-metadioxane, and isoprene from 4,4-dimethyl-metadioxane and 4,5-dimethyl-metadioxane. The reason why the selectivity to the conjugated diolefins can be remarkably increased by removing water soluble parts from the catalyst supporting ortho- or pyro-phosphoric acid on the carrier having silica as the main components is considered probably due to the removal of water soluble ortho- and pyro-phosphoric acid having high activity to the polymerization of olefins. Accordingly, the method of the invention has large effects that the deactivation of catalyst is very few when conjugated diolefins are manufactured from mono- or di-alkyl-metadioxane so that the catalyst contributes less to the manufacturing cost of conjugated diolefin. It should be further remarked that the catalyst to be used in the method of the invention exhibits almost no activity to the polymerization of olefins and dehydration reaction of alcohol. Suppositions which have heretofore been generally believed that the acidic points on the catalyst surface active to the polymerization and dehydration are also active to the decomposition of alkyl-metadioxane to conjugated diolefins have unexpectedly overturned by the entirely different results, that is, the catalysts inactive to either of polymerization or dehydration may be active to the catalytic decomposition of alkyl-meta-dioxane to conjugated diolefins.

By the X-ray diffractions of solid phosphoric acid catalysts calcined at various temperatures, it is apparent that the catalysts calcined at 250° C. and 520° C. show same type of pattern, yet the catalyst calcined at 980° C. shows the lack of peaks at $2\theta=15°$ and $23°$ among the peaks of the X-ray diffraction for the catalysts calcined at 250° C. and 520° C. On the other hand, a solid phosphoric acid catalyst calcined at 250° C. is extracted by water until the extract becomes non-acidic and dried, then such catalyst lacks the peaks at $2\theta=15°$ and $23°$ so that it will be recognized that the above two operations give the same effect to the catalyst. From such points the catalyst to be used in the invention can be recognized to have entirely different catalytic activity if compared with the conventional so-called solid phosphoric acid catalysts.

According to the method of the invention it is preferable to dilute mono- or di-alkyl-metadioxane vapor entering into the reactor with an inert gas, such as steam, nitrogen, carbon dioxide, lower paraffinic hydrocarbons in order to prevent a slight carbonization and polymerization of mono- or di-alkyl-metadioxane or the produced conjugated diolefins in the contact zone and the amount of the diluent is preferably equal amount to alkyl-metadioxane by weight or 10 times thereof. The reaction is usually carried out under atmospheric pressure, yet it may be carried out at a high pressure or reduced pressure at the reaction temperature lying within the range when mono- or di-alkyl-metadioxane is in the vapor state. The temperature of the contact zone effecting catalytic decomposition may be 100 to 400° C., preferably 150° C. to 250° C. Conjugated diolefins in the reaction product obtained from the reactor are cooled and condensed, then unreacted material and other products are separated by a suitable means such as distillation and the unreacted alkyl-metadioxane is separated from the other substances and reused for the decomposition reaction, and formaldehyde and mono-olefin produced after the reaction are recovered and reused for the synthesis of alkyl-metadioxane.

The method of the invention will now be explained by examples.

EXAMPLE 1

A solid phosphoric acid prepared from 75 parts of kieselguhr and 240 parts of ortho-phosphoric acid and dried at 150° C. is calcined in an electric furnace at various temperatures by passing nitrogen gas for 16 hours, then 10 cc. of the product is packed in an iron reactor which is placed in a heating bath of silicon oil and 4,4-dimethyl-metadioxane was decomposed at a reaction temperature of 200° C.

The above catalyst was contacted with metadioxane, water and nitrogen as the raw material respectively in the state of mixed gas at the feed rate of 12 cc./hr., 18 cc./hr. and 1 cc./hr. respectively. The products taken out of the reactor were cooled and then caught through a trap filled with carbon tetrachloride and a trap cooled in Dry Ice-acetone bath and analyzed by means of gas chromatography and the results are shown in Table 1.

*Table 1*

| Calcination temperature (° C.) | Metadioxane conversion (percent) | Isoprene yield on reacted metadioxane (percent) |
|---|---|---|
| 150 | 72.9 | 60.5 |
| 210 | 70.2 | 58.9 |
| 520 | 84.6 | 55.1 |
| 750 | 95.2 | 81.2 |
| 980 | 89.9 | 83.9 |
| 1,100 | 76.6 | 88.4 |
| 1,150 | 70.5 | 93.2 |

As seen from the table, the selectivity of isoprene was very much improved by effecting the calcination at a temperature above 700° C. which temperature had heretofore been considered as very harmful to the activity of solid phosphoric acid.

EXAMPLE 2

A solid phosphoric acid catalyst made from kieselguhr and ortho-phosphoric acid similarly to Example 1 was calcined at 480° C. and extracted with water until the acidic nature was lost and after water soluble parts were removed and dried, then 10 cc. of such dried catalyst were used to decompose 4,4-dimethyl-metadioxane in the similar manner as in Example 1. As the result the conversion of metadioxane was 82.4% and isoprene yield on the reacted metadioxane was 77.8%. When the same catalyst was used without water extraction the conversion of metadioxane was 87.0% and isoprene yield on the reacted metadioxane was 53.6%.

EXAMPLE 3

A solid phosphoric acid catalyst manufactured from 75 parts of silica-gel and 240 parts of ortho-phosphoric acid was calcined at 400° C. and used for the decomposition of 4,4-dimethyl-metadioxane in the similar manner as in Example 2. Its result showed that the conversion of metadioxane was 89.5% and isoprene yield on the reacted metadioxane was 83.4%. When the catalyst is used without water extraction the conversion of metadioxane was 93.6% and isoprene yield on the reacted metadioxane was 56.3%.

EXAMPLE 4

4-methyl-metadioxane was decomposed by using the same catalyst as in Example 2 and its result showed that the conversion of metadioxane was 80.2% and butadiene yield on the reacted metadioxane was 90.2%. When the catalyst is used without effecting water extraction the conversion was 79.5% and butadiene yield on the reacted metadioxane was 51.3%.

What we claim is:

1. A method for manufacturing conjugated diolefins which comprises the steps of decomposing in vapor phase and in the presence of an inert diluent, a compound selected from the group consisting of mono- and di-alkyl metadioxane by contact with a phosphorus-containing catalyst prepared by impregnating the carrier having silica as the main component thereof with an acid selected from the group consisting of orthophosphoric and pyrophosphoric acid, and calcining the impregnated carrier at a temperature of from above 700° C. to 1200° C. for more than two hours.

2. A method according to claim 1, wherein the compound is 4-methyl-metadioxane and the conjugated diolefin is butadiene.

3. A method according to claim 1, wherein the compound is 4,4-dimethyl-metadioxane and the conjugated diolefin is isoprene.

4. A method according to claim 1, wherein the reaction temperature is between 100° C. to 400° C.

5. A method according to claim 1, wherein the phosphorous-containing catalyst has an X-ray diffraction pattern characterized by the absence of conventional phosphoric acid catalyst peaks at $2\theta$ equals 15° and 23°.

6. A method according to claim 1, wherein the reaction temperature is between 150° C. to 250° C.

7. A method for manufacturing conjugated diolefins which comprises the steps of decomposing in vapor phase and in the presence of an inert diluent, a compound selected from the group consisting of mono- and di-alkyl metadioxane by contact with a phosphorus-containing catalyst prepared by impregnating a carrier having silica as the main component thereof with an acid selected from the group consisting of orthophosphoric and pyrophosphoric acid, calcining the impregnated support at a temperature less than 700° C. for at least two hours, to obtain thereon phosphorus compounds as decomposition products of the acid, and washing the calcined carrier to remove unreacted acid while leaving said phosphorus compounds on said carrier.

References Cited by the Examiner

UNITED STATES PATENTS

| 3,057,923 | 10/1962 | Hellin et al. | 260—681 |
| 3,060,238 | 10/1962 | Hellin et al. | 260—681 |
| 3,060,239 | 10/1962 | Hellin et al. | 260—681 |
| 3,060,240 | 10/1962 | Hellin et al. | 260—681 |

ALPHONSO D. SULLIVAN, *Primary Examiner.*

JOSEPH R. LIBERMAN, *Examiner.*